US008185385B2

(12) United States Patent
Lee et al.

(10) Patent No.: US 8,185,385 B2
(45) **Date of Patent: *May 22, 2012**

(54) METHOD FOR SEARCHING FIXED CODEBOOK BASED UPON GLOBAL PULSE REPLACEMENT

(75) Inventors: Eung-Don Lee, Daejon (KR); Do-Young Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,271

(22) Filed: Apr. 26, 2010

(65) Prior Publication Data

US 2010/0211386 A1 Aug. 19, 2010

Related U.S. Application Data

(63) Continuation of application No. 10/740,310, filed on Dec. 17, 2003, now Pat. No. 7,739,108.

(30) Foreign Application Priority Data

Mar. 25, 2003 (KR) ................................ 2003-18600

(51) Int. Cl.
*G01L 19/00* (2006.01)
*G01L 19/12* (2006.01)
*H04L 12/66* (2006.01)

(52) U.S. Cl. ......................... 704/219; 704/223; 370/352

(58) Field of Classification Search .................. 704/219, 704/223; 370/352
See application file for complete search history.

(56) References Cited

U.S. PATENT DOCUMENTS

| | | | |
|---|---|---|---|
| 5,701,392 A | 12/1997 | Adoul et al. | |
| 5,960,389 A | 9/1999 | Jarvinen et al. | |
| 6,269,331 B1 | 7/2001 | Alanara et al. | |
| 6,385,574 B1 | 5/2002 | Benno | |
| 2002/0103938 A1 | 8/2002 | Brooks et al. | |

FOREIGN PATENT DOCUMENTS

KR 1020010095585 11/2001

OTHER PUBLICATIONS

U.S. Appl. No. 10/740,310, filed Dec. 17, 2003, Eung-Don Lee et al., Electronics and Telecommunications Reaserch Institute.
U.S. Patent Office Action, mailed Jul. 24, 2007, issued in corresponding U.S. Appl. No. 10/740,310.
U.S. Patent Office Action, mailed Jun. 12, 2008, issued in corresponding U.S. Appl. No. 10/740,310.
U.S. Patent Office Action, mailed Oct. 1, 2008, issued in corresponding U.S. Appl. No. 10/740,310.
U.S. Patent Office Action, mailed Dec. 17, 2008, issued in corresponding U.S. Appl. No. 10/740,310.

(Continued)

*Primary Examiner* — Justin Rider
(74) *Attorney, Agent, or Firm* — Staas & Halsey LLP

(57) ABSTRACT

The present research can decrease the amount of computation and enhance speech quality by using a global pulse replacement method in a fixed codebook search. The fixed codebook search method in a speech encoder based upon global pulse replacement, includes the steps of: (a) computing absolute values of the pulse-position likelihood-estimator vectors; (b) temporarily obtaining a codebook vector; (c) computing a mathematical equation by replacing a pulse; (d) determining whether a value computed based upon the mathematical equation is increased after pulse replacement; (e) obtaining a new codebook vector by replacing the pulse; and (f) maintaining a previous codebook vector.

4 Claims, 5 Drawing Sheets

OTHER PUBLICATIONS

U.S. Patent Office Action, mailed Jul. 21, 2009, issued in corresponding U.S. Appl. No. 10/740,310.

U.S. Patent Office Action, mailed Nov. 3, 2009, issued in corresponding U.S. Appl. No. 10/740,310.

U.S. Patent Notice of Allowance, mailed Jan. 25, 2010, issued in corresponding U.S. Appl. No. 10/740,310.

METHOD FOR SEARCHING FIXED CODEBOOK BASED UPON GLOBAL PULSE REPLACEMENT

CROSS-REFERENCE TO RELATED APPLICATIONS

This application is a U.S. continuation application filed under 35 USC 1.53(b) claiming priority benefit of U.S. Ser. No. 10/740,310 filed in the United States on Dec. 17, 2003 now U.S. Pat. No. 7,739,108, which claims earlier priority benefit to Korean Patent Application No. 10-2003-18600 filed with the Korean Intellectual Property Office on Mar. 25, 2003, the disclosures of which are incorporated herein by reference.

BACKGROUND

1. Field

The present invention relates to a method for searching fixed codebook based upon global pulse replacement; and, more particularly, to a high-speed fixed codebook search method based upon the global pulse replacement in a speech encoding such as an algebraic code excited linear prediction (ACELP) encoding and a computer readable recording medium for recording a program that executes the method.

2. Description of the Related Art

There are various kinds of vocoders for compressing speech. A code excited linear predictive coding (CELP) vocoder is broadly used in mobile communication systems. The CELP vocoder includes a linear prediction filter and a unit for generating an excitation signal. It also requires a pitch filter to model a pitch of speech. Information related to the pitch filter is obtained from an adaptive codebook.

The excitation signal is obtained from a physical codebook or by finding a code vector in an algebraic codebook. Both methods mentioned above are called codebook search. In order to separate a concept of codebook from the adaptive code book, the codebook for obtaining the excitation signal is called a fixed codebook.

The ACELP is a speech encoding method suggested by Sherbrooke University, Canada. G.723.1 and G.729 are adopted as standard speech codecs and they are used for Internet telephones and voice communications in corporations.

Among conventional methods for searching the fixed codebook search, a full search method used in a 6.3 kbps G.723.1 speech encoder provides a good speech quality but it has high computational complexity, which leads to the development of a focused search method used in a 5.3 kbps G.729 or G.723.1 speech encoder.

The focused search method limits a searching range by setting a threshold value. By using correlation of entire pulse position combinations, a threshold value is compared with the sum of magnitudes of correlation vectors of entire pulse position combinations at tracks 0, 1 and 2. Then, pulse positions of track 3 are searched for the pulse position combinations which overflow the threshold value.

However, the computation amount is increased and complexity is not always the same in the focused search method because the entire combinations of the pulse positions at tracks 0, 1 and 2 are compared with the threshold value.

In order to solve the problem of the focused search method, a depth first tree search method is used in G.729A, AMR-NB and AMR-WB codecs. Pulse positions are successively searched at every two tracks in the depth first tree search method. The computation amount is reduced and the complexity is always the same because candidate pulse positions are chosen based on the correlation of one of the two tracks and the rest of the pulse positions are searched.

However, the computation amount for searching a pulse position in the depth first tree search method is still large compared to speech quality. In order to solve the problem of the depth first tree search method, an efficient codebook search method using a pulse replacement procedure is disclosed by H. C. Park, Y. C. Choi and D. Y. Lee, in a paper entitled "Efficient Codebook Search Method for ACELP Speech Codecs," in pp. 17-19 of 2002 Institute of Electrical and Electronics Engineers (IEEE) Speech Coding Workshop Proceedings. The least significant pulse is replaced during the pulse replacement procedure. Therefore, the computation amount is decreased significantly by using the pulse replacement procedure. However, the speech quality is degraded because the pulse replacement procedure may be finished before an optimal pulse is searched. Although the pulse replacement procedure is repeated, the speech quality is not enhanced. Also, large computation amount is required because initial codebook vectors are searched in the order of tracks sequentially.

SUMMARY

It is, therefore, an object of the present invention to provide a method for searching a fixed codebook that replacing pulses globally in a speech encoder by temporarily determining initial codebook vectors at each track based upon magnitudes of codebook vectors, replacing one pulse at each track, and finding an adequate codebook vector with a small computation amount, and a computer readable recording medium for recording a program that executes the method.

In accordance with one aspect of the present invention, there is provided a fixed codebook search method in a speech encoder by using a global pulse replacement method, including the steps of: (a) computing magnitudes of the pulse-position likelihood-estimator vectors for each pulse position; (b) temporarily obtaining an codebook vector by choosing a pulse position having largest magnitude; (c) computing a mathematical equation using the codebook vector, the number of entire pulse positions in a sub-frame, a signal for which the fixed codebook search is used, an impulse response of a linear prediction synthesizing filter, the number of pulses in the sub-frame and the pulse-position likelihood-estimator vectors by replacing a pulse of each track in the codebook vector; (d) determining whether a value computed based upon the mathematical equation is increased after replacing the pulse of each track; (e) obtaining a new codebook, vector by replacing the pulse with the pulse having a maximum value computed based upon the equation when a value computed by the mathematical equation is increased after replacing the pulse of each track; and (f) keeping a previous codebook vector when a value computed based upon the mathematical equation is not increased after replacing the pulse of each track.

In accordance with another aspect of the present invention, there is provided a computer readable recording medium for reading a program that implements a fixed codebook search method by using a global pulse replacement in a speech encoding system including a microprocessor, including the steps of: (a) computing magnitudes of a pulse-position likelihood-estimator vectors for each pulse position; (b) temporarily obtaining an codebook vector by choosing a pulse position having largest magnitude; (c) computing a mathematical equation using the codebook vector, the number of entire pulse positions in a sub-frame, a signal for which the fixed codebook search is used, an impulse response of a linear prediction synthesizing filter, the number of pulses in the sub-frame and the pulse-position likelihood-estimator vectors by replacing a pulse of each track in the codebook vector; (d) determining whether a value computed based upon the mathematical equation is increased after replacing the pulse of each track; (e) obtaining a new codebook vector by replacing the pulse with the pulse having a maximum value computed based upon the equation when a value computed by the mathematical equation is increased after replacing the pulse of each track; and (f) keeping a previous codebook vector when a value computed based upon the mathematical equation is not increased after replacing the pulse of each track.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF EMBODIMENTS

Other objects and aspects of the invention will become apparent from the following description of the embodiments with reference to the accompanying drawings, which is set forth hereinafter.

Speech encoding methods are divided into a waveform coding, a parametric coding and a code excited linear prediction (CELP) coding. Characteristics of the three methods are as follows.

A speech signal is encoded sample by sample by using the wave form coding and the wave form coding is applicable to music. However, the compression rate is not high.

Parameters showing characteristics of vocal tract and characteristics of speech are extracted from speech samples in the parametric coding. This method provides a high compression rate but the speech quality is degraded.

The CELP coding adopts the advantages of the waveform coding and the parametric coding. It provides a high compression rate and good speech quality.

Figure 1:
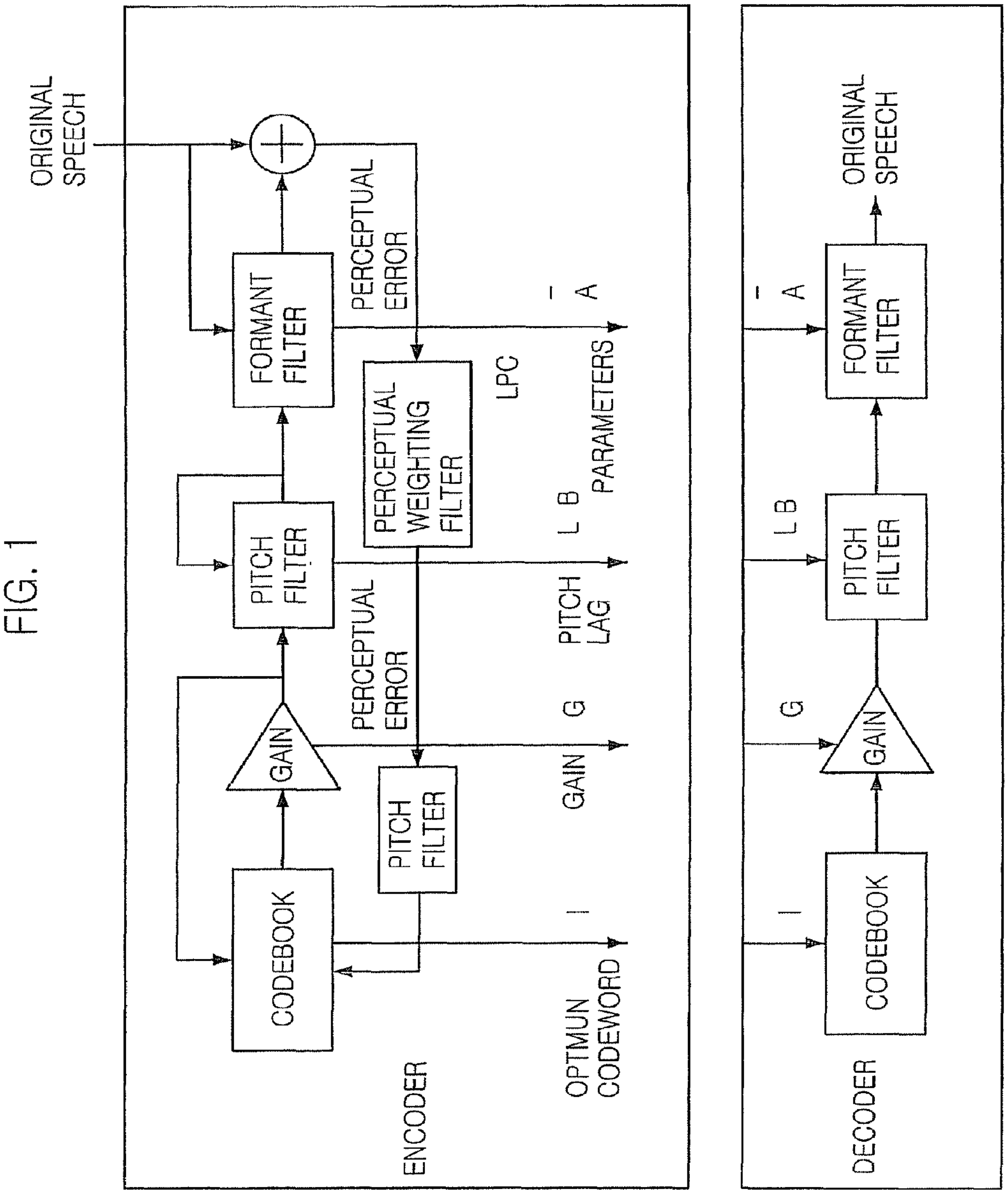
FIG. 1 is a block diagram showing a code excited linear prediction (CELP) coding system in accordance with the present invention.

FIG. 1 is a block diagram showing a CELP coding system in accordance with the present invention. The CELP coding method includes a linear predictive coding (LPC) analysis procedure, an adaptive codebook search procedure and a fixed codebook search procedure.

Figure 2A:
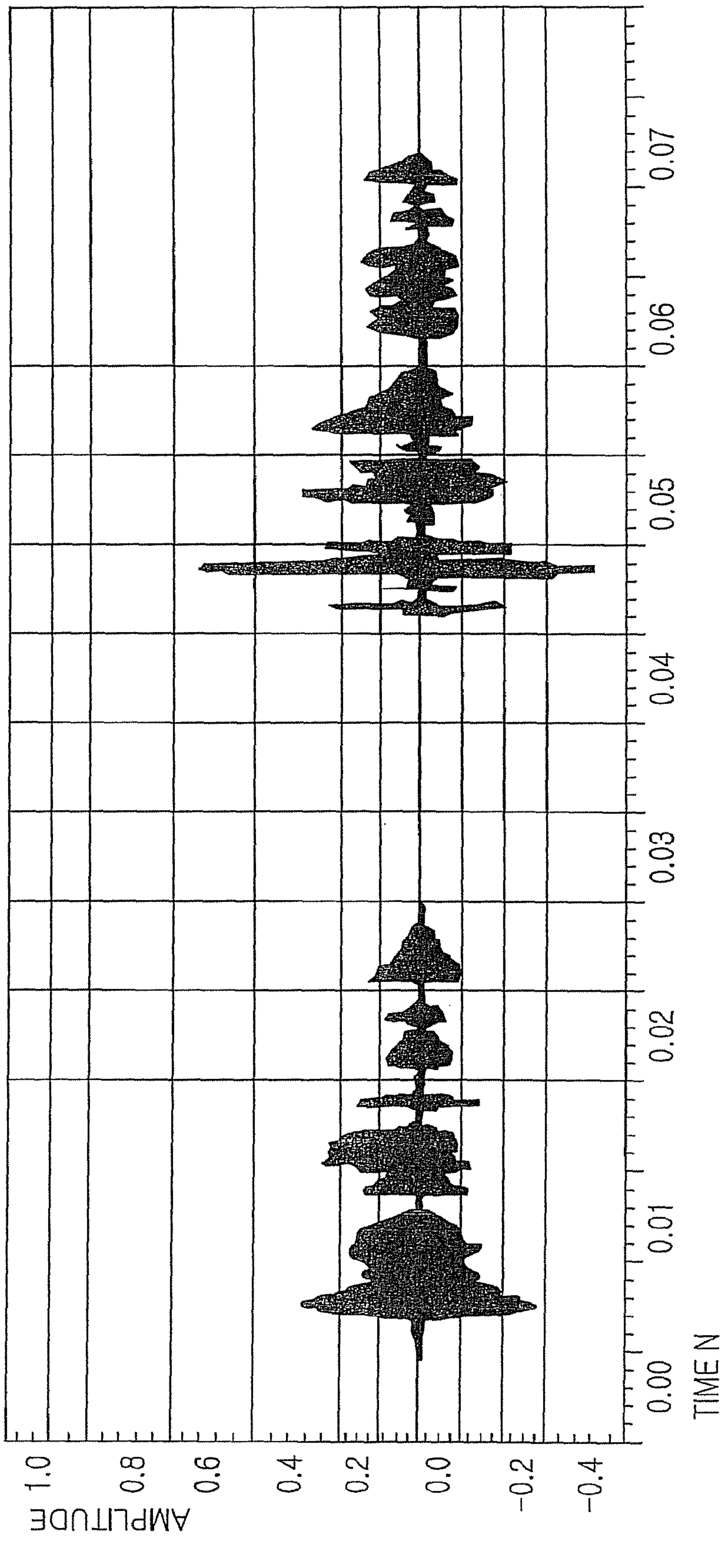
FIGS. 2A to 2C are graphs showing speech signals in the CELP coding system in accordance with the present invention.
Figure 2B:
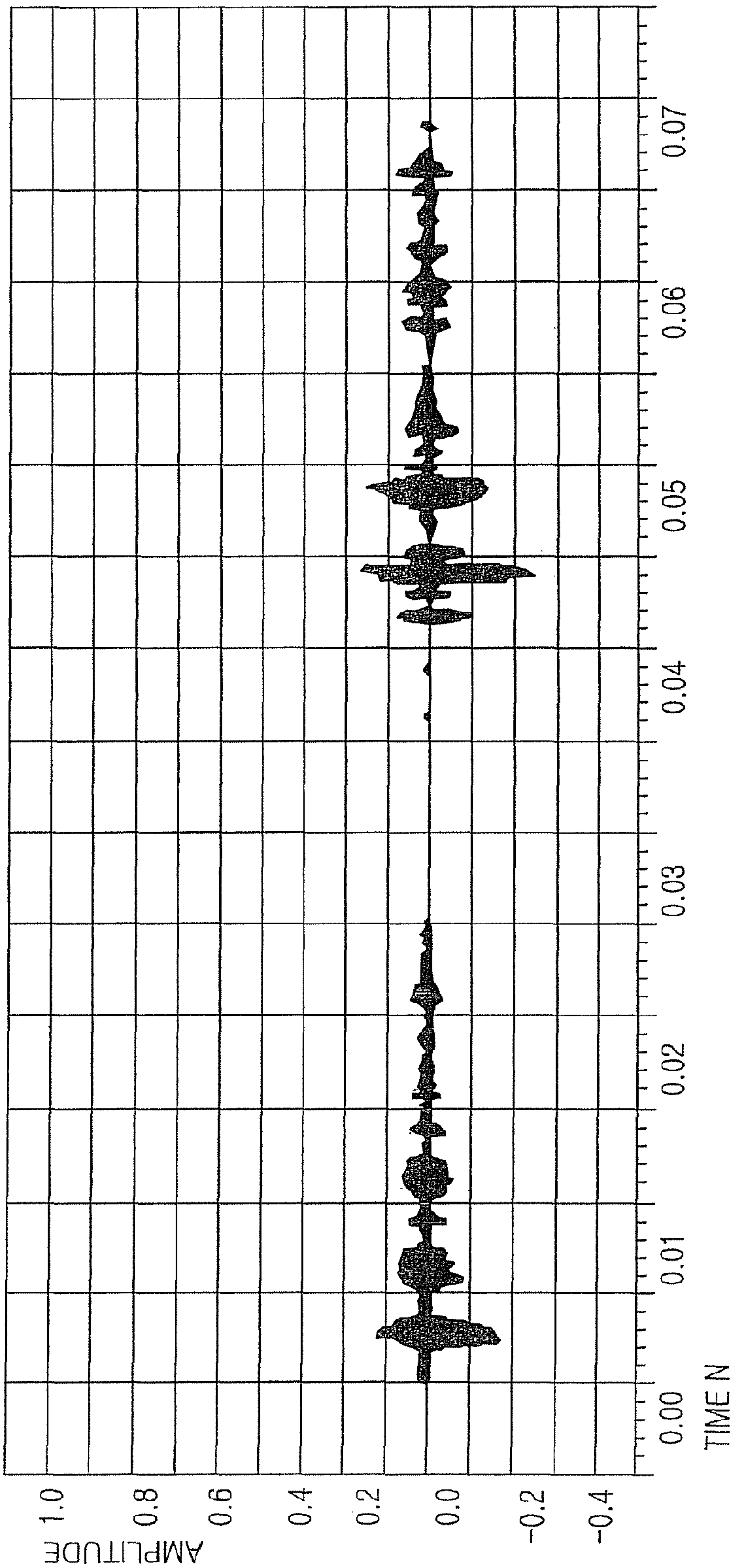
Figure 2C:
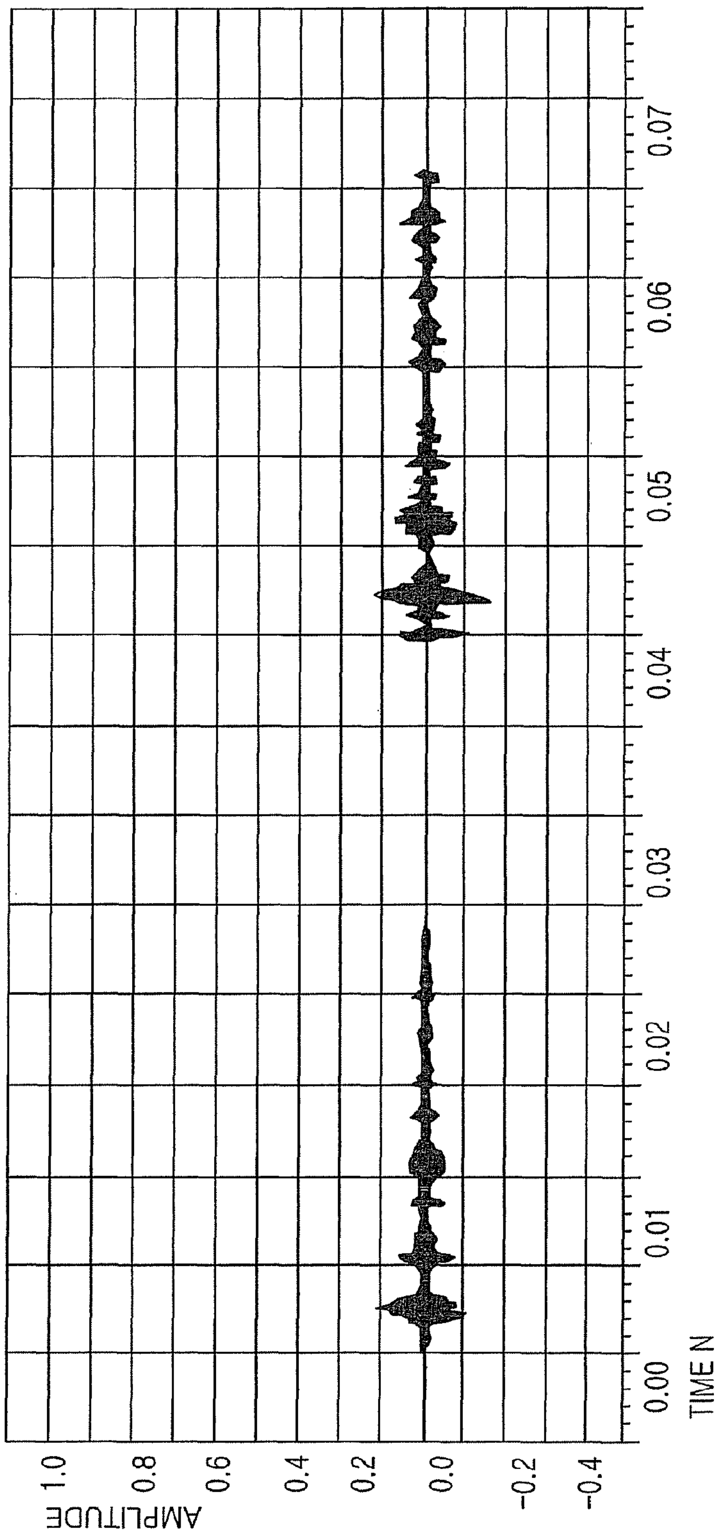

FIGS. 2A to 2C are graphs showing speech signals in the CELP coding system in accordance with the present invention. Characteristics of the three procedures of the CELP coding method are explained as follows.

Redundancies of each speech sample are removed during the LPC analysis. Referring to FIG. 1, a formant filter is obtained after the LPC analysis. The LPC analysis is executed frame by frame.

Once the redundancies of each speech sample are removed, pitch of the speech sample is searched in the adaptive codebook search and a pitch filter is obtained with reference to FIG. 1. The pitch searching is divided into a step of open-loop searching and a step of closed-loop searching. An approximate pitch value is obtained by performing the open-loop searching and a refined pitch value is obtained by performing the close-loop searching. The open-loop searching is executed frame by frame, and the closed-loop searching is executed sub-frame by sub-frame.

Once the redundancy and the pitch are removed from the speech signal, a codeword is determined by minimizing the mean squared error between the input speech and the synthesized speech in the fixed codebook search. The fixed codebook search is executed sub-frame by sub-frame.

The fixed codebook is composed of a plurality of codewords, and a codeword includes several representative samples in the sub-frame. The most adequate codeword which can express the speech signal is searched in the codebook during the fixed codebook search.

For example, in accordance with the G.729A codec, the sub-frame is composed of 40 samples and one codeword includes 4 samples. Therefore, 4 samples that best represent the 40 samples are searched during the fixed codebook search of the G.729A codec. The well-known fixed codebook searching methods are the full search method, the focused search method and the depth first tree search method as mentioned in the description of the related art. Also, the least significant pulse replacement method is disclosed lately. The present invention suggests a global pulse replacement method by overcoming the problem of the least significant pulse replacement method.

The global pulse replacement method is explained as follows. The present invention is applied to the CELP speech coding system and a preferred embodiment of the present invention is based upon AMR-NB 12.2 kbps mode.

A codebook vector that maximizes a value of Eq. 1 is chosen in each fixed codebook search.

$$\underset{k}{Max}Q_k = \underset{k}{Max}\frac{C_k^2}{E_k} = \underset{k}{Max}\frac{(d^t c_k)^2}{c_k^t \Phi c_k} \qquad \text{Eq. 1}$$

A $K_{th}$ codebook vector is described as $C_k$ and t denotes a transposed matrix. A correlation vector d and a matrix .PHI. are described as:

$$d(n) = \sum_{i=n}^{M-1} x_2(i)h(i-n), \quad i = 0, \ldots , M \qquad \text{Eq. 2}$$

$$\phi(i, j) = \sum_{n=j}^{M-1} h(n-i)h(n-j), \quad i = 0, \ldots , M, \quad j = i, \ldots , M \qquad \text{Eq. 3}$$

In accordance with Eg. 2 and 3, the total number of pulse positions of a sub-frame is described as M, a target signal for the fixed codebook searching is expressed as $x_2(n)$ and an impulse response of a linear predictive synthesizing filter is described as h(n). For example, the total number of pulse positions M is 40 in the AMR-NB as shown in Table 1.

TABLE 1

| Track | Pulse | Location |
|---|---|---|
| 0 | $i_0, i_5$ | 0, 5, 10, 15, 20, 25, 30, 35 |
| 1 | $i_1, i_6$ | 1, 6, 11, 16, 21, 26, 31, 36 |
| 2 | $i_2, i_7$ | 2, 7, 12, 17, 22, 27, 32, 37 |

TABLE 1-continued

| Track | Pulse | Location |
|---|---|---|
| 3 | $i_3, i_8$ | 3, 8, 13, 18, 23, 28, 33, 38 |
| 4 | $i_4, i_9$ | 4, 9, 14, 19, 24, 29, 34, 39 |

Table 1 shows a structure of the fixed codebook in accordance with the 12.2 kbps AMR-NB speech coder.

Also, a numerator and a denominator of Eq. 1 are described as:

$$C = \sum_{i=0}^{N_p-1} \text{sign}\{b(i)\}d(m_i) \quad \text{Eq. 4}$$

$$E = \sum_{i=0}^{N_p-1} \phi(m_i, m_j) + 2\sum_{i=0}^{N_p-2}\sum_{j=i+1}^{N_p-1} \text{sign}\{b(i)\}\text{sign}\{b(j)\}\phi(m_i, m_j) \quad \text{Eq. 5}$$

The number of pulses in a sub-frame is described as $N_p$ and $m_i$ denotes a position of an $i^{th}$ pulse. For example, $N_p$ is 10 in the AMR-NB 12.2 kbps mode. A pulse-position likelihood-estimator vector b(n) is described as:

$$b(n) = \frac{r_{LTP}(n)}{\sqrt{\sum_{i=0}^{M-1} r_{LTP}(i)r_{LTP}(i)}} + \frac{d(n)}{\sqrt{\sum_{i=0}^{M-1} d(i)d(i)}} \quad \text{Eq. 6}$$

A pitch residual signal is described as $r_{LTP}(n)$. Therefore, the b(n) is a function of the pitch residual signal and the correlation d(n).

Figure 3:
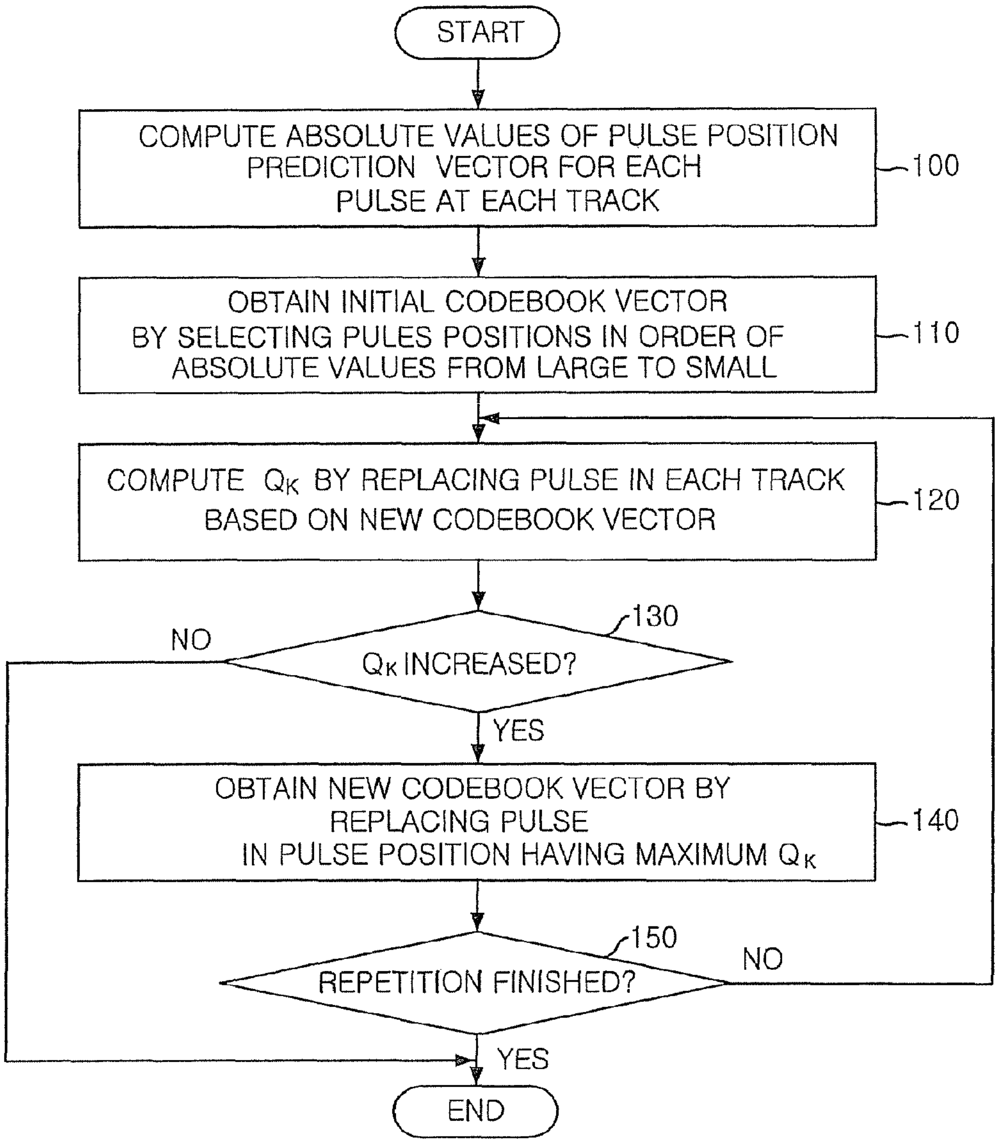
FIG. 3 is a flowchart showing a global pulse replacement method in accordance with a preferred embodiment of the present invention.

FIG. 3 is a flowchart showing a global pulse replacement method in accordance with a preferred embodiment of the present invention.

Referring to FIG. 3, at step 100, absolute values of the factors in the pulse-position likelihood-estimator vectors for each pulse position of a track are computed. At step 110, an initial codebook vector is obtained by selecting pulse positions in the order of the absolute values from large to small. At step 120, a $Q_k$ is computed by replacing a pulse of each track in the codebook vector. At step 130, it is determined whether the computed $Q_k$ is increased after replacing the pulse of each track. At step 140, a new codebook vector is obtained by replacing the pulse with the pulse having increased $Q_k$. At step 150, the pulse replacement process is completed if a predetermined repeating numbers of the pulse replacement procedures.

The magnitude of the pulse-position likelihood-estimator vector at step 100 is described as |b(n)|. The magnitudes of the pulse-position likelihood-estimator vectors for each pulse in tracks 0, 1, 2, 3, 4 and 5 in a specific sub-frame are described as:

TABLE 2

| Track | absolute values of factors of the pulse-position likelihood-estimator vectors for each pulse position |
|---|---|
| 0 | 0.10, 0.31, 0.15, 0.02, 0.10, 0.17, 0.67, 0.35 |
| 1 | 0.29, 0.07, 0.06, 0.21, 0.00, 0.04, 0.32, 0.00 |
| 2 | 0.36, 0.17, 0.06, 0.04, 0.34, 0.29, 0.66, 0.05 |
| 3 | 0.18, 0.08, 0.43, 0.06, 0.10, 0.48, 0.16, 0.12 |
| 4 | 0.33, 0.05, 0.13, 0.26, 0.11, 0.11, 0.11, 0.05 |

At the step 110, the initial codebook vectors are obtained for $N_p$ pulses in each track and M pulses in a sub-frame by choosing a position having the largest magnitudes computed at the step 100. For example, referring to Table 2, pulse positions of initial codebook vectors (i0, i5, i1, i6, i2, i7, i3, i8, i4, i9) become (30, 35, 1, 31, 2, 32, 13, 28, 4, 19).

At the step 120, $Q_k$ values are computed by replacing pulse positions of each track in the codebook vector.

For example, referring to Table 2, the pulse positions of the initial codebook vector (30, 35, 1, 31, 2, 32, 13, 28, 4, 19) are changed to (0, 35, 1, 31, 2, 32, 13, 28, 4, 19), (5, 35, 1, 31, 2, 32, 13, 28, 4, 19), (10, 35, 1, 31, 2, 32, 13, 28, 4, 19), (15, 35, 1, 31, 2, 32, 13, 28, 4, 19), (20, 35, 1, 31, 2, 32, 13, 28, 4, 19), (25, 35, 1, 31, 2, 32, 13, 28, 4, 19) by replacing 30 at track 0 and $Q_k$ is computed. Also, the pulse positions of the initial codebook vector (30, 35, 1, 31, 2, 32, 13, 28, 4, 19) are changed to (30, 0, 1, 31, 2, 32, 13, 28, 4, 19), (30, 5, 1, 31, 2, 32, 13, 28, 4, 19), (30, 10, 1, 31, 2, 32, 13, 28, 4, 19), (30, 15, 1, 31, 2, 32, 13, 28, 4, 19), (30, 20, 1, 31, 2, 32, 13, 28, 4, 19), (30, 25, 1, 31, 2, 32, 13, 28, 4, 19) by replacing 35 at the track 0 and $Q_k$ is computed.

The pulse positions of the initial codebook vector (30, 35, 1, 31, 2, 32, 13, 28, 4, 19) are changed to (30, 35, 6, 31, 2, 32, 13, 28, 4, 19), (30, 35, 11, 31, 2, 32, 13, 28, 4, 19 (30, 35, 16, 31, 2, 32, 13, 28, 4, 19), (30, 35, 21, 31, 2, 32, 13, 28, 4, 19), (30, 35, 26, 31, 2, 32, 13, 28, 4, 19), (30, 35, 36, 31, 2, 32, 13, 28, 4, 19) by replacing 1 at track 1 and $Q_k$ is computed. Also, the pulse positions of the initial codebook vector (30, 35, 1, 31, 2, 32, 13, 28, 4, 19) are changed to (30, 35, 1, 6, 2, 32, 13, 28, 4, 19), (30, 35, 1, 11, 2, 32, 13, 28, 4, 19), (30, 35, 1, 16, 2, 32, 13, 28, 4, 19), (30, 35, 1, 21, 2, 32, 13, 28, 4, 19), (30, 35, 1, 26, 2, 32, 13, 28, 4, 19), (30, 35, 1, 36, 2, 32, 13, 28, 4, 19) by replacing 31 at the track 1 and $Q_k$ is computed.

The pulse positions of the initial codebook vector (30, 35, 1, 31, 2, 32, 13, 28, 4, 19) are changed to (30, 35, 1, 31, 7, 32, 13, 28, 4, 19), (30, 35, 1, 31, 12, 32, 13, 28, 4, 19), (30, 35, 1, 31, 17, 32, 13, 28, 4, 19), (30, 35, 1, 31, 22, 32, 13, 28, 4, 19), (30, 35, 1, 31, 27, 32, 13, 28, 4, 19), (30, 35, 1, 31, 37, 32, 13, 28, 4, 19) by replacing 2 at track 2 and $Q_k$ is computed. Also, the pulse positions of the initial codebook vector (30, 35, 1, 31, 2, 32, 13, 28, 4, 19) are changed to (30, 35, 1, 31, 2, 7, 13, 28, 4, 19), (30, 35, 1, 31, 2, 12, 13, 28, 4, 19), (30, 35, 1, 31, 2, 17, 13, 28, 4, 19), (30, 35, 1, 31, 2, 22, 13, 28, 4, 19), (30, 35, 1, 31, 2, 27, 13, 28, 4, 19), (30, 35, 1, 31, 2, 37, 13, 28, 4, 19) by replacing 32 at the track 2 and $Q_k$ is computed.

The pulse positions of the initial codebook vector (30, 35, 1, 31, 2, 32, 13, 28, 4, 19) are changed to (30, 35, 1, 31, 2, 32, 3, 28, 4, 19), (30, 35, 1, 31, 2, 32, 8, 28, 4, 19), (30, 35, 1, 31, 2, 32, 18, 28, 4, 19), (30, 35, 1, 31, 2, 32, 23, 28, 4, 19), (30, 35, 1, 31, 2, 32, 33, 28, 4, 19), (30, 35, 1, 31, 2, 32, 38, 28, 4, 19) by replacing 13 at track 3 and $Q_k$ is computed. Also, the pulse positions of the initial codebook vector (30, 35, 1, 31, 2, 32, 13, 28, 4, 19) are changed to (30, 35, 1, 31, 2, 32, 13, 3, 4, 19), (30, 35, 1, 31, 2, 32, 13, 8, 4, 19), (30, 35, 1, 31, 2, 32, 13, 18, 4, 19), (30, 35, 1, 31, 2, 32, 13, 23, 4, 19), (30, 35, 1, 31, 2, 32, 13, 33, 4, 19), (30, 35, 1, 31, 2, 32, 13, 38, 4, 19) by replacing 28 at the track 3 and $Q_k$ is computed.

The pulse positions of the initial codebook vector (30, 35, 1, 31, 2, 32, 13, 28, 4, 19) are changed to (30, 35, 1, 31, 2, 32, 13, 28, 9, 19), (30, 35, 1, 31, 2, 32, 13, 28, 14, 19), (30, 35, 1, 31, 2, 32, 13, 28, 24, 19), (30, 35, 1, 31, 2, 32, 13, 28, 29, 19), (30, 35, 1, 31, 2, 32, 13, 28, 34, 19), (30, 35, 1, 31, 2, 32, 13, 28, 39, 19) by replacing 4 at track 4 and $Q_k$ is computed. Also, the pulse positions of the initial codebook vector (30, 35, 1, 31, 2, 32, 13, 28, 4, 19) are changed to (30, 35, 1, 31, 2, 32, 13, 28, 4, 9), (30, 35, 1, 31, 2, 32, 13, 28, 4, 14), (30, 35, 1, 31, 2, 32, 13, 28, 4, 24), (30, 35, 1, 31, 2, 32, 13, 28, 4, 29), (30, 35, 1, 31, 2, 32, 13, 28, 4, 34), 30, 35, 1, 31, 2, 32, 13, 28, 4, 39) by replacing 19 at track 4 and $Q_k$ is computed.

At the step 130, it is determined whether $Q_k$ is increased by replacing the pulses. If the $Q_k$ is not increased, it is determined that the codebook vector before replacing the pulses is an optimal codebook vector and the pulse replacement procedures are finished.

However, the pulse replacement procedures may be repeated predetermined times, even though $Q_k$ is not increased by replacing the pulses. In this case, because the same complexity occurs for the fixed codebook searching, it is easy to functionally associate with other parts of the speech coder.

At the step 140, if $Q_k$ is increased by replacing the pulses, the pulse position which has a maximum $Q_k$ is replaced with the old pulse position. Therefore, speech quality can be enhanced.

For example, referring to Table 2, a pulse position which has a maximum $Q_k$ of 60 $Q_k$ values computed by replacing pulse positions at each track becomes the pulse of the initial codebook vector and a new codebook vector is obtained.

At the step 150, if the pulse replacement procedures are repeated for the predetermined times, the pulse replacement procedures are finished. The pulse replacement procedures are repeated if a new codebook vector is obtained each time the pulse is replaced. If the codebook vector is not changed, the operator can set the pulse replacement procedure to be finished or repeated.

When the present invention is applied to the AMR-NB 12.2 kbps mode, 12 values of $Q_k$ are computed at each track and if redundant computation is removed, computation occurs 60+48(N−1) times during N times of repetition.

When 4 times of the pulse replacements are executed, speech quality is almost the same as that of the depth first tree search method. The computation amount at the AMR-NB 12.2 kbps mode is decreased to 1024 times by decreasing 80% of the computation amount of the depth first tree search method. When the global pulse replacement method of the present invention is applied to another CELP speech encoder, average decrease of the computation amount is about 70%. Therefore, computation amount is decreased remarkably and the speech quality is enhanced by using the efficient pulse replacement method in the fixed codebook search.

Also, the fixed codebook search method of the present invention can be applied to various types of the fixed codebook search in the algebraic codebook.

The method of the present invention can be saved in a computer readable recording medium, e.g., a CD-ROM, a RAM, a ROM, a floppy disk, a hard disk, and an optical/magnetic disk.

As mentioned above, the present invention can decrease the computation amount and enhance the speech quality by determining the initial codebook vectors at each track based upon magnitudes of codebook vectors, replacing one pulse at each track and determining codebook vectors.

While the present invention has been shown and described with respect to the particular embodiments, it will be apparent to those skilled in the art that many changes and modifications may be made without departing from the spirit and scope of the invention as defined in the appended claims.

What is claimed is:

1. A method for searching a fixed codebook in a speech encoder based on a global pulse replacement, comprising:

Initially determining a codebook vector;

computing decision values (Qk) for each of a plurality of codebook vectors which are respectively obtained by replacing a pulse of each track in the determined codebook vector with a new pulse, wherein the decision value (Qk) is a value used for searching the fixed codebook in an algebraic code excited linear prediction (ACELP) speech encoding method;

if a maximum value among the computed decision value is greater than the decision value of the determined codebook vector, determining the codebook vector having the maximum value among the plurality of codebook vectors as a new codebook vector; and computing decision values (Qk) for each of a plurality of codebook vectors which are respectively obtained by replacing a pulse of each track in the new codebook vector with a new pulse, wherein the decision values (Qk) for the track corresponding to the previously replaced pulse in the new codebook vector are not computed to remove computation redundancy, and repeating the determining the codebook vector, wherein the ACELP speech encoding method includes a linear predictive coding analysis, an adaptive codebook search procedure, and a fixed code book procedure.

2. The method of claim 1, wherein the initially determining codebook vector comprises:

computing a pulse-position likelihood-estimator vectors for each pulse position; and determining the codebook vector based on the computed pulse-position likelihood-estimator vectors.

3. The method as recited in claim 1, wherein the decision values (Qk) are described as:

$$Q_k = \frac{(d^t c_k)^2}{c_k^t \Phi c_k}$$

wherein ck denotes a kth fixed codebook vector, t denotes a transpose matrix, d denotes a correlation vector between an objective signal and a linear predictive synthesis filter, and ϕ denotes a correlation matrix between the linear predictive synthesis filter and an impulse response.

4. A computer readable recording medium for reading a program that implements a method for searching a fixed codebook by using a global pulse replacement in a speech encoding system including a microprocessor, comprising:

initially determining a codebook vector;

computing decision values (Qk) for each of a plurality of codebook vectors which are respectively obtained by replacing a pulse of each track in the determined codebook vector with a new pulse, wherein the decision value (Qk) is a value used for searching the fixed codebook in an algebraic code excited linear prediction (ACELP) speech encoding method;

if a maximum value among the computed decision values is greater than the decision value of the determined codebook vector, determining the codebook vector having the maximum value among the plurality of codebook vectors as a new codebook vector; and computing decision values (Qk) for each of a plurality of codebook vectors which are respectively obtained by replacing a pulse of each track in the new codebook vector with a new pulse in the way that only one pulse is replaced for each of the newly obtained codebook vectors, wherein the decision values (Qk) for the track corresponding to the previously replaced pulse in the new codebook vector are not computed to remove computation redundancy, and repeating the determining the codebook vector, wherein the ACELP speech encoding method includes a linear predictive coding analysis, an adaptive codebook search procedure, and a fixed code book procedure.

* * * * *